US 9,154,030 B2

(12) United States Patent
Bianco et al.

(10) Patent No.: US 9,154,030 B2
(45) Date of Patent: Oct. 6, 2015

(54) CONTROL DEVICE OF A SWITCHING POWER SUPPLY

(71) Applicants: DORA S.p.A., Aosta (IT); STMicroelectronics S.r.l., Agrate Brianza (IT)

(72) Inventors: Alberto Bianco, Gressan (IT); Claudio Adragna, Monza (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 491 days.

(21) Appl. No.: 13/749,539

(22) Filed: Jan. 24, 2013

(65) Prior Publication Data
US 2013/0194842 A1    Aug. 1, 2013

(30) Foreign Application Priority Data

Jan. 26, 2012  (IT) .............................. MI2012A0089

(51) Int. Cl.
*H02M 3/156* (2006.01)
*H02M 1/42* (2007.01)
*H02M 3/157* (2006.01)

(52) U.S. Cl.
CPC ............ *H02M 3/156* (2013.01); *H02M 1/4225* (2013.01); *H02M 3/157* (2013.01); *Y02B 70/126* (2013.01)

(58) Field of Classification Search
CPC ... H02M 1/42; H02M 1/4208; H02M 1/4225; H02M 3/156; H02M 3/1563; H02M 3/157
USPC ......................................... 323/235, 282–285
See application file for complete search history.

(56) References Cited

U.S. PATENT DOCUMENTS

| 5,367,247 A | 11/1994 | Blocher et al. |
| 6,191,565 B1 | 2/2001 | Lee et al. |
| 6,259,614 B1 | 7/2001 | Ribarich et al. |

(Continued)

FOREIGN PATENT DOCUMENTS

EP    1387476 A1    2/2004

OTHER PUBLICATIONS

Unitrode Integrated Circuits, Product Note entitled: "High Power-Factor Preregulator," UC1852, UC2852, UC3852, 10 pages, Texas Instruments © 2008.
ON Semiconductor, Product Note entitled: "Compact Fixed Frequency Discontinuous or Critical Conduction Voltage Mode Power Factor Correction Controller," NCP1601A, NCP1601B, 18 pages, © Semiconductor Components Industries, LLC, Jul. 2009—Rev. 5.

(Continued)

Primary Examiner — Jessica Han
(74) Attorney, Agent, or Firm — Seed IP Law Group PLLC

(57) ABSTRACT

A control device controls a switching converter. The converter has an input alternating supply voltage, a regulated direct voltage on the output terminal, and a switch connected to an inductor. The control device controls the closing and opening time period of said switch for each cycle and receives a first input signal representative of the current flowing through one element of the converter. The control device comprises a counter configured to count a time period, a comparator configured to compare said first input signal with a second signal, digital control block configured to control the closing and opening of said switch and to activate said counter to start the counting of said time period when the said first input signal crosses said second signal, with said switch being closed. The digital control block is configured to open the switch when the counter finishes the counting of said time period.

23 Claims, 3 Drawing Sheets

(56) References Cited

U.S. PATENT DOCUMENTS

| | | | |
|---|---|---|---|
| 6,307,361 | B1 | 10/2001 | Yaakov et al. |
| 6,842,353 | B2 | 1/2005 | Yamada et al. |
| 7,106,038 | B1 | 9/2006 | Xin-LeBlanc |
| 7,307,405 | B2 | 12/2007 | Adragna et al. |
| RE40,016 | E | 1/2008 | Ribarich et al. |
| 7,345,464 | B2 | 3/2008 | Steele |
| 7,541,795 | B1 * | 6/2009 | Smith et al. ............ 323/285 |
| 7,592,791 | B2 * | 9/2009 | Emira ............ 323/283 |
| 8,467,209 | B2 | 6/2013 | Adragna |
| 2004/0095101 | A1 | 5/2004 | Pidutti et al. |
| 2004/0263140 | A1 | 12/2004 | Adragna et al. |
| 2006/0013026 | A1 | 1/2006 | Frank et al. |
| 2006/0208789 | A1 | 9/2006 | Shimada |
| 2008/0246444 | A1 | 10/2008 | Shao et al. |
| 2008/0272748 | A1 * | 11/2008 | Melanson ............ 323/207 |
| 2008/0304195 | A1 * | 12/2008 | Lin ............ 361/89 |
| 2010/0110593 | A1 | 5/2010 | Kim et al. |
| 2010/0165683 | A1 | 7/2010 | Sugawara |
| 2010/0315838 | A1 | 12/2010 | Mao et al. |
| 2011/0157940 | A1 * | 6/2011 | Zhang ............ 363/126 |
| 2012/0262082 | A1 | 10/2012 | Esaki et al. |

OTHER PUBLICATIONS

Renesas, Product Note entitled: "Critical Conduction Mode PFC Control IC," R2A20113SP, REJ03F0279-0200, Rev.2.00, Jul. 8, 2009.

Langeslag, W. et al., "VLSI Design and Application of a High-Voltage-Compatible SoC-ASIC in Bipolar CMOS/DMOS Technology for AC-DC Rectifiers," IEEE Transactions on Industrial Electronics 54(5):2626-2641, Oct. 2007.

Kim, J.W. et al., "Variable On-time Control of the Critical Conduction Mode Boost Power Factor Correction Converter to Improve Zero-crossing Distortion," International Conference on Power Electronics and Drives Systems, 2005 (PEDS 2005):1542-1546, Nov. 2005.

Huber, L. et al., "Effect of Valley Switching and Switching-Frequency Limitation on Line-Current Distortions of DCM/CCM Boundary Boost PFC Converters," IEEE Transactions on Power Electronics 24(2):339-347, Feb. 2009.

Adragna, "Control Loop Modeling of L6561-Based TM PFC," Application Note AN1089, STMicroelectronics, Mar. 2000, 12 pages.

* cited by examiner

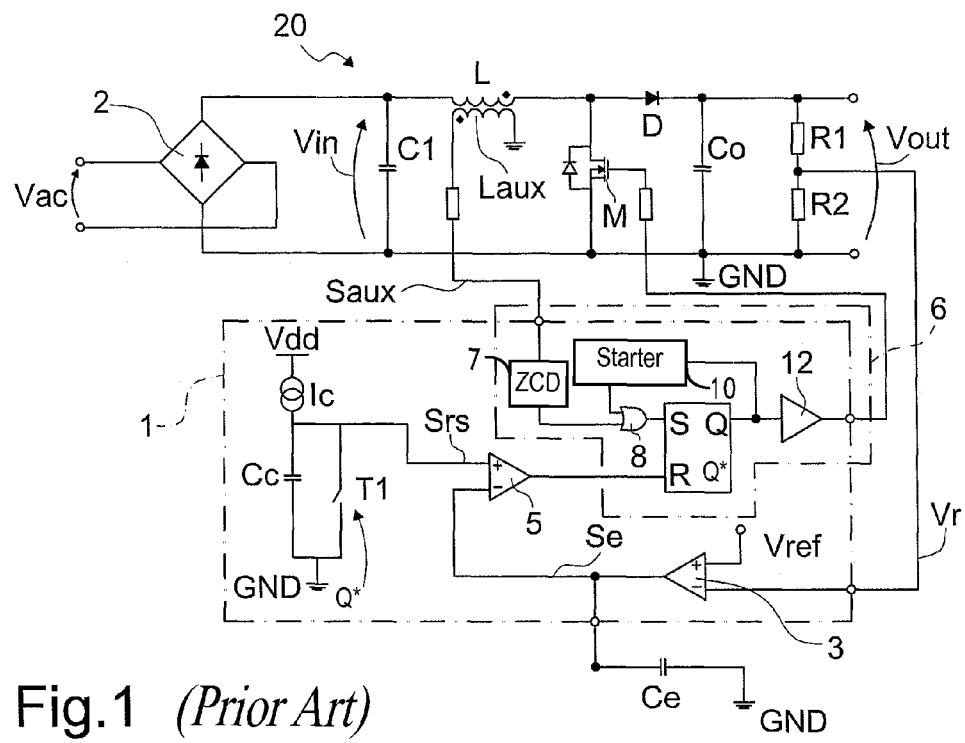
Fig. 1 *(Prior Art)*
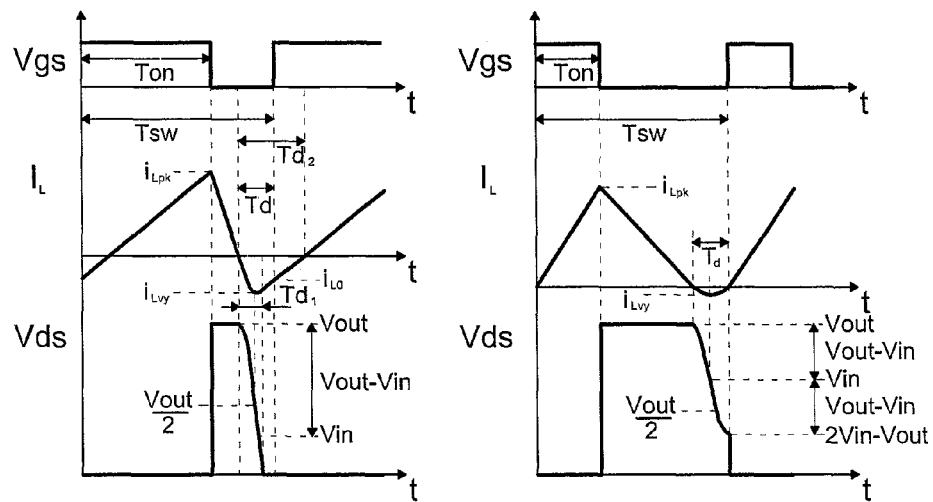
Fig. 2 *(Prior Art)*

CONTROL DEVICE OF A SWITCHING POWER SUPPLY

BACKGROUND

1. Technical Field

The present disclosure relates to a digital control device of a switching power supply.

2. Description of the Related Art

It is generally known to use devices for actively correcting the power factor (PFC) of switching power supplies used in common electronic apparatuses such as computers, televisions, monitors, etc., and for supplying power to fluorescent lamps, i.e., switching pre-regulator stages which must absorb a current from the power line, said current is quasi-sinusoidal and in phase with the supply voltage. A switching power supply of the current type thus comprises a PFC and a DC-DC converter connected to the PFC output.

A typical switching power supply comprises a DC-DC converter and an input stage connected to the power distribution line which comprises a full-wave diode rectifier bridge and a capacitor connected downstream so as to produce a non-regulated direct voltage from the sinusoidal alternating supply voltage. The capacitor has a great enough capacitance for a relatively small ripple being present at its terminals as compared to a direct level. Therefore the rectifier diodes of the bridge will only conduct over a short portion of each half cycle of the supply voltage, as the instantaneous value thereof is less than the voltage of the capacitor over most of the cycle. The result is the current absorbed by the power line consists of a series of short impulses the amplitude of which is 5-10 times the resulting average value.

This has significant consequences: the current absorbed from the power line has peak and rms (root-mean-square) values much higher than the case of sinusoidal current absorption, the supply voltage is distorted due to the almost simultaneous impulse absorption of all utilities connected to the power line, the current in the neutral conductor in the case of three-phase systems is highly increased and there is low use of the energy potentials of the power system. In fact, the waveform of impulse current includes many odd harmonics, which although they do not contribute to the power provided to the load, they contribute to increasing the rms current absorbed by the power line and therefore to increasing the energy dissipation.

In quantitative terms, this may all be expressed both in terms of Power Factor (PF), intended as ratio of the real power (the one the power supply sends to the load plus the one dissipated therein in the form of heat) to the apparent power (the product of the rms voltage by the rms current absorbed), and in terms of Total Harmonic Distortion (THD), generally intended as percentage ratio of the energy associated with all larger harmonics to the one associated with the fundamental harmonic. Typically, a power supply with capacitance filter has a PF between 0.4 and 0.6 and a THD higher than 100%.

A PFC arranged between the rectifier bridge and the input of the DC-DC converter allows a current quasi sinusoidal and phased with the voltage, to be absorbed from the network, thus making the PF close to 1 and decreasing the THD.

FIG. 1 schematically shows a PFC pre-regulator stage comprising a boost converter 20 and a control device 1. The PWM control device has a variable frequency, also called "Transition Mode" (TM) as the device works on the borderline between the continuous (CCM) and discontinuous (DCM) modes of conducting current through the inductor; in particular, device 1 is of the constant Ton type. According to this method, the turn-on period of the power transistor is used as a control variable and, during each cycle of the supply voltage, it is kept constant at the value required to obtain the regulation of the voltage output from the converter 20 by means of a feedback control loop. The boost converter 20 comprises a full-wave diode rectifier bridge 2 having an input supply voltage Vac, a capacitor C1 (which serves as a high frequency filter) having a terminal connected to the diode bridge 2 and another terminal connected to ground GND and on which a voltage Vin exists, an inductance L connected to a terminal of the capacitor C1, a MOS power transistor M having its drain terminal connected to a terminal of the inductance L downstream of the latter and having its source terminal connected to ground GND, a diode D having its anode connected to the common terminal of the inductance L and the transistor M, and its cathode connected to a capacitor Co having another terminal connected to ground GND. The boost converter 20 generates an output direct voltage Vout across the capacitor Co which is higher than the maximum peak supply voltage, typically 400 V for systems powered by means of European power line or universal power line. Such a voltage Vout will be the input voltage of the DC-DC converter connected to the PFC.

The control device 1 should keep the output direct voltage Vout at a constant value by means of a feedback control action. The control device 1 comprises an operational error amplifier 3 adapted to compare part of the output voltage Vout, i.e., the voltage Vr given by Vr=R2×Vout/(R2+R1) (where the resistances R1 and R2 are connected in series to each other and the series is in parallel to the capacitor Co) with a reference voltage Vref, e.g., of the value of 2.5 V, and generates an output error signal Se across a capacitor Ce connected between the output of amplifier 3 and ground GND.

The error signal Se is sent to the inverting input of a comparator PWM 5 while the signal Srs exists at the non-inverting input; the signal Srs is a voltage ramp across a capacitor Cc powered by a current generator Ic in the time periods whenever the switch T1 is open, which coincide with those when M is on as precisely the duration Ton of the turn-on of M is to be controlled. If signals Srs and Se are equal, the comparator 5 sends a signal to a control block 6 adapted to control the transistor M and which, in this case, turns it off. Block 6 comprises a zero current detecting block 7 having at the input the signal Saux deriving from the inductor Laux coupled with the inductor L; the signal Saux is representative of the demagnetization of the core of the transformer formed by the inductances L and Laux. Block 7 is capable of sending an impulse signal to a OR gate 8, the other input of which is connected to a starter 10 adapted to send a signal to the OR gate 8 at the initial instant of time. The output signal S of the OR gate 8 is the set input S of a set-reset flip-flop 11 having another input R which is the signal at the output from the comparator 5, and having an output signal Q and an output signal Q* which is the negated signal Q. The signal Q is sent to the input of a driver 12 which controls the turn-on or turn-off of the transistor M and therefore the duration of the turn-on time period Ton and the turn-off time period Toff in each switching cycle Tsw while the signal Q* controls the closing and opening of switch T1.

FIG. 2 shows the time diagrams of some signals involved in the circuit in FIG. 1, i.e., the voltage between the gate and source terminals of transistor M Vgs, the voltage between the drain and source terminals of transistor M Vds and the current in inductor $I_L$.

In TM operation, operation is never exactly done at the borderline between DCM and CCM but slightly in DCM. In fact, the transistor M is not turned or conveniently when the current of the inductor is zeroed, as the voltage Vds in that moment is still equal to the output voltage Vout (typically 400 V). Therefore, the parasitic capacitance Cd associated with the drain terminal in that moment has energy equal to ½·Cd·Vout² which would be dissipated in the resistance $R_{DS(on)}$ of transistor M when it is turned on. If instead the turn-on is delayed until the oscillation of voltage Vds resulting from zeroing the current $I_L$ of the inductor reaches its minimum, equal to 2Vin−Vout, the power stored in the parasitic capacitance Cd and dissipated in the transistor M at the turning-on would be considerably reduced.

Moreover, if 2Vin−Vout<0 (i.e., Vin<Vout/2), where the body diode of transistor M substantially cuts the oscillation to zero, these energy losses would be zeroed resulting in the so-called "soft-switching". In part due to their operation and in part due to the introduction of intentional delays, zero current detection circuits or ZCD inside the controllers PFC, such as that shown in FIG. 1, allow the transistor M to be turned on at the drain oscillation valley ("valley switching"); this delay is indicated by Td, which is equal to half the period of said oscillation. This slightly moves the operation in DCM, but the remarks made on the pure TM are still valid, at least until Td is negligible with respect to the switching period, which typically occurs in a fairly large field of operating conditions of the converter if values Vin>>0 are considered, which are the significant ones in terms of the power transfer.

During the oscillation of voltage Vds, the current $I_L$ of inductor L becomes negative by passing through the parasitic capacitance of transistor M and, also possibly the body of transistor M if the voltage Vds reaches zero and, thus, directly biases it.

In this latter case, shown in the left-hand time diagrams, the voltage Vds reaches zero after a time $Td_1$<Td. Until that moment, the current $I_L$ of the inductor is sinusoidal, but from that moment on, due to the turning on of the body diode which sets a voltage substantially equal to Vin at its terminals, it starts linearly increasing and at the instant Td is still negative. At this point, the transistor M (the voltage Vgs is forced high) is turned on and the direct current ramp starts. The current becomes positive at the instant $Td_2$>Td. Therefore, there is a time interval in which transistor M is turned on, but the current $I_L$ of the inductor is negative. It should be noted that, if the input voltage is such that the peak voltage Vpk is Vpk<Vout/2 (which occurs with the American or Japanese power line, for example), this time interval exists in the entire power line cycle. The ratio of the duration of this interval to that of the switching cycle becomes increasingly greater as the voltage Vin decreases, thus reaching the maximum at the zeroes of the supply voltage (Vin=0). In addition to this, as the current peak tends to zero when Vin tends to zero, the negative peak of the inductor current may even become higher than the positive peak around the zeros of the supply voltage.

If 2Vin−Vout>0 (i.e., Vin>Vout/2), the oscillation valley of the voltage Vds remains at a positive value and the body diode is not turned on. Therefore, the negative portion of the current of the inductor is entirely a sinusoidal arch and the current is zero at the instant Td when transistor M is turned on (i.e., $Td_2$=Td). Therefore, the time interval when the current is negative with the transistor M turned on is absent, but the negative peak of the inductor current (in this case of lower amplitude because the oscillation of voltage Vds is of lower amplitude) may be comparable to the positive peak around the zeroes of the supply voltage.

The current $I_L$ of the inductor linearly rises with a slope of $$\frac{dI_L}{dt} = \frac{Vin}{L}$$

in each turn-on cycle of transistor.

Since the input voltage is sinusoidal, Vin=Vpk sin θ where θ is the phase angle of the supply voltage, therefore:

$$\frac{dI_L}{dt}(\theta) = \frac{Vpk}{L}\sin\theta.$$

Considering the initial value $I_{L0}$ of the inductor current when transistor M is turned on, the peak value of the current of the inductor will be:

$$I_{Lpk}(\theta) = I_{L0} + \frac{Vpk}{L} Ton \cdot \sin\theta,$$

$I_{L0}$=0 if Vin>Vout/2 while, by neglecting the variation of current in the interval between Td/2 and $Td_1$, if Vin<Vout/2, $I_{L0}$ may be assumed to be equal to the negative peak $I_{Lvy}$ (which occurs at the instant Td/2), which is equal to:

$$I_{L0} \approx I_{Lvy} = \frac{Vin - Vout}{Zd} = \frac{Vpk\sin\theta - Vout}{Zd},$$

where Zd is the characteristic impedance of the resonant circuit consisting of the inductor and the parasitic capacitance on the drain terminal. Therefore, considering the preceding equations:

$$I_{Lpk}(\theta) = \begin{cases} -\dfrac{Vout}{Zd} + Vpk\sin\theta\left(\dfrac{1}{Zd} + \dfrac{1}{L}Ton\right) & Vpk\sin\theta < Vout/2 \\ \dfrac{Vpk}{L}Ton \cdot \sin\theta & Vpk\sin\theta \geq Vout/2 \end{cases}$$

Therefore with a constant period Ton, there is only a sinusoidal envelope of the peak current for instantaneous values of the supply voltage which are higher than Vout/2. There is a reduction of the peak value $I_{Lpk}(\theta)$ for values less than Vout/2 and, accordingly, a distortion of the envelope due to the constant term −Vout/Zd, which reduction is as great as said instantaneous voltage is low. It is obvious that said distortion results in the distortion of the mains current and therefore in a greater THD and a lower PF.

Furthermore, the reduction of the peak current has a further deleterious action on the THD: the increase of crossover distortion, seen as a brief flat zone in the waveform of the input current close to the zeroes of the supply voltage.

This distortion growing as the load of the PFC decreases and as the rms supply voltage increases, derives from the input-output energy transfer defect which occurs close to the zeros of the supply voltage. In that zone, the energy stored in the inductor—linked to the peak value of the current—is very low, insufficient to charge the parasitic capacitance Cd until reaching the voltage Vout (typically 400 V) so as to turn on the diode D and transfer the power of the inductor to the output. Therefore, the diode is not turned on over a certain number of switching cycles and the energy is partially returned to the filter capacitor arranged downstream the rectifier bridge. This is not discharged and keeps the bridge in inverse bias, by deleting the input current and performing a dead zone in the waveform of the line current.

The fact that the peak current for a given Ton is lower than the one expected in the region wherein Vin<Vout/2, results that the power transported around the zeroes of the supply voltage is further reduced with respect to the case of sinusoidal envelope. Thereby, the number of switching cycles is increased, in which there is no power transfer towards the output and, therefore, the dead zone of the current absorbed by the network widens, with the consequential increase of THD and further reduction of PF.

However the capacitor C1 of the boost converter in FIG. 1 absorbs a current given by:

$$Ic1 = C\frac{dVin}{dt}.$$

Said current is a further distortion element; said current, added to the current absorbed by the converter, results in a greater distortion of the current absorbed by the power line.

BRIEF SUMMARY

One embodiment of the present disclosure is a control device of a switching power supply which eliminates said above mentioned disadvantages.

One embodiment of the present disclosure is a control device of a switching converter having an input alternating supply voltage a regulated direct voltage on the output terminal, and a switch connected to an inductor. The digital control device is adapted to control the closing and opening time period of said switch for each cycle, and receives a first input signal representative of the current flowing through one element of said converter. The control device includes a counter configured to count a time period, a comparator configured to compare said first input signal with a second signal, and a digital block configured to control the closing and opening of said switch and to activate said counter to start the counting of said time period when the first input signal crosses said second signal, with said switch being closed. The digital block is configured to open the switch when the counter finishes to count said time period.

BRIEF DESCRIPTION OF THE SEVERAL VIEWS OF THE DRAWINGS

The features and advantages of the present disclosure will become apparent from the following detailed description of an embodiment thereof, illustrated only by way of non-limitative example in the annexed drawings, in which:

FIG. 1 shows a control device of a switching power supply in accordance with the known art;

FIG. 2 shows the time diagrams of some signals involved in the circuit in FIG. 1 if Vin<Vout/2 or Vin>Vout/2;

DETAILED DESCRIPTION

Figure 3:
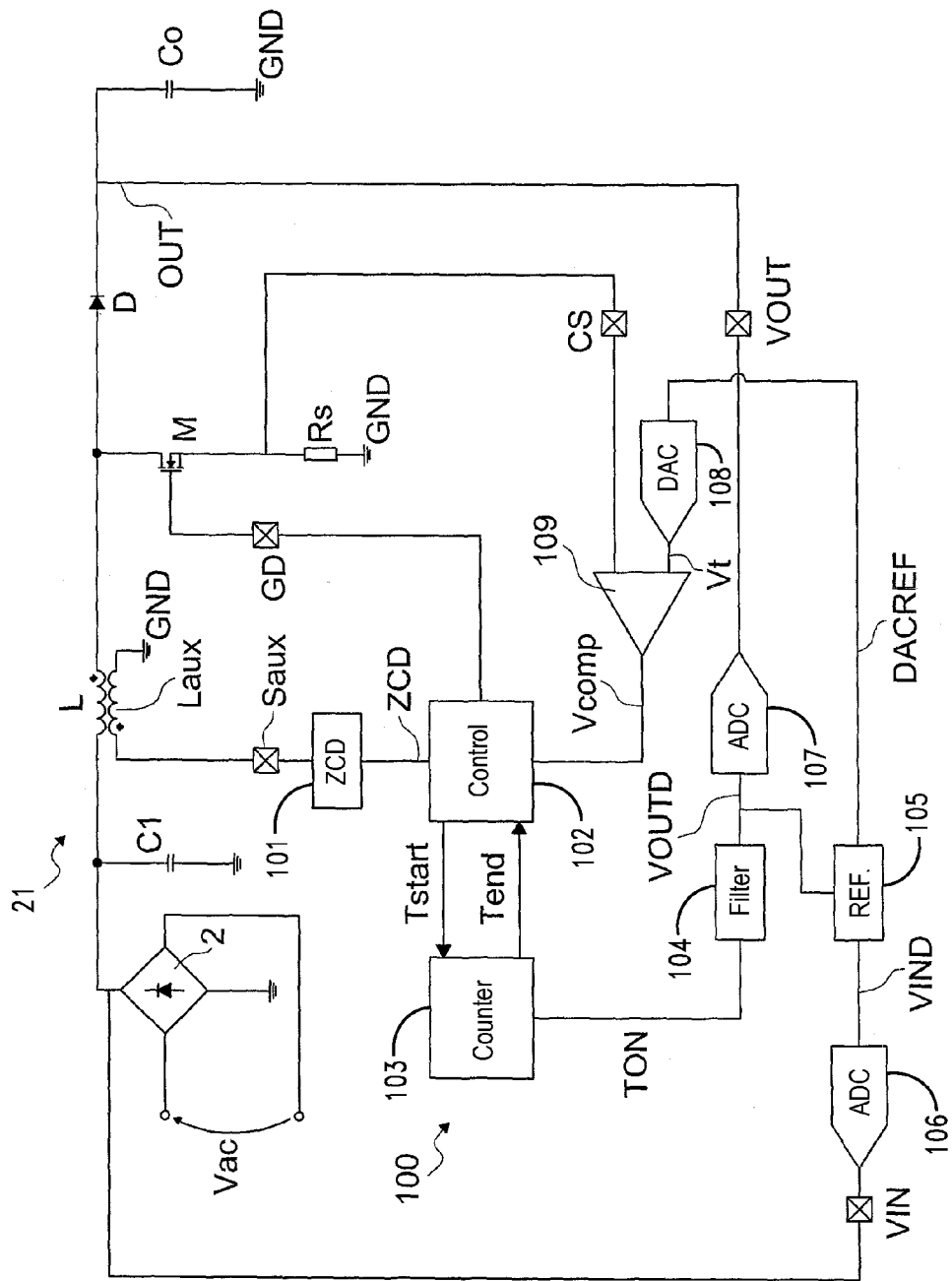
FIG. 3 shows a control device of a switching power supply in accordance with the present disclosure.

With reference to FIG. 3, a control device 100 of a switching power supply in accordance with the present disclosure is shown. The power supply comprises a converter 21, preferably a boost converter, having an input alternating supply voltage Vac and a regulated voltage VOUT at the output terminal OUT. The converter 21 comprises a switch M, preferably a MOS power transistor and the digital control device 100 is adapted to control the on time period Ton and the off time period Toff of said switch M at each cycle Tsw.

The control device 100 comprises a counter 103 configured to count a time period TON and a digital control block 102 configured to control the switch M by means of a signal GD.

The boost converter 21 comprises a full-wave diode rectifier bridge 2 having an input supply voltage Vac, a capacitor C1 (which serves as a high frequency filter) having first and second terminals, respectively connected to the diode bridge 2 and to ground GND, across which a voltage VIN exists, an inductance L connected to the first terminal of the capacitor C1, a MOS power transistor M having its drain terminal connected to a terminal of the inductance L downstream of the latter and having its source terminal connected to ground GND, a diode D having its anode connected to the common terminal of the inductance L and the transistor M, and its cathode connected to a first terminal of a capacitor Co having a second terminal connected to ground GND. The boost converter 21 generates an output direct voltage VOUT across capacitor Co which is higher than the maximum peak supply voltage, typically 400 V for systems powered by a European power line or universal power line. Such a voltage VOUT will be the input voltage of the DC-DC converter connected to the PFC.

The converter 21 comprises a zero current detecting block 101 having the input signal Saux from the inductor Laux coupled with the inductor L; the signal Saux is representative of the demagnetization of the core of the transformer formed by the inductances L and Laux. The block 101 is capable of sending a first signal ZCD, preferably an impulse signal, representative of the demagnetization of the core of the transformer of the inductances L and Laux to the digital control block 102.

The control device 100 should keep the output voltage VOUT at a constant value by means of a feedback control action. The control device 100 comprises an analog-to-digital converter 107 configured to convert in a digital signal VOUTD the voltage VOUT and a digital reference block 105 configured to set a digital reference value DACREF, preferably a constant value or a zero value. Preferably the control device 100 comprises another analog-to-digital converter 106 configured to convert the voltage VIN to a digital signal VIND and the digital block 105 sets the value of the digital reference value DACREF in response to the values of VIND or/and VOUT; the calculation effectuated for each sample of the voltages VIND and VOUT is:

$$DACREF=K1(VOUTD-VIND)+K2(VIND-VI\!N\_OLD)$$

$$VIN\_OLD=VIND$$

where K1 and K2 are constants.

The reference block 105 may be implemented by a microcontroller set with a firmware stored in a memory. The digital reference value DACREF can assume the value 0, a fixed value different from zero, a value depending on the digital signal VIND or a value depending on the digital signals VIND and VOUTD.

A current detector, preferably a resistance Rs of the converter 21, is adapted to detect the value CS of the current Ics flowing through at least one element L, M, of the converter.

The control device 100 comprises a proportional-integral filter 104 configured to execute the following operations:

$$VERR = VOUTD - VREFD$$

$$INTEG = INTEG + VERR$$

$$TON = K2 \cdot VERR + K1 \cdot INTEG$$

where VREFD is a digital reference value (a numerical constant) and the time period TON is the time period that the counter 103 must count.

The digital reference value DACREF is sent to a digital-to-analog converter 108 adapted to emit a signal Vt, in response to the value DACREF, that is compared by means of the comparator 109 with the signal CS. The output signal Vcomp of the comparator 109 is sent to the digital control block 102. The last is configured to control the closing of the switch M in response of the zero crossing of the signal ZCD and to activate said counter 103 by means of a signal Tstart to start the counting of said time period TON when the signal CS crosses the signal Vt. The digital control block 102 is configured to open the switch M when the counter 103 finishes to count said time period TON and sends the signals Tend to the digital control block 102. The digital control block 102 may be implemented by a microcontroller and a memory storing a firmware adapted to set the microcontroller.

The digital control block 102 is adapted to synchronize the start Tstart of the counter 103 with the crossing of the signal CS, which is representative of the current flowing through the converter, by the signal Vt, with the switch M being closed.

The control device 100 is typically integrated in a silicon chip.

The resistance Rs may be arranged in series to the source terminal of the transistor M, thereby only detecting the part of inductor current during the conduction step of the transistor M or introduced on the path toward ground GND of the current. In the last case the current of the inductor L flows through this resistance, whereby such a current is shown in scale Rs by the drop of the voltage CS (negative with respect to ground) across said resistance. A current sensing system of the inductor is typically used for safety purposes to prevent the peak currents from reaching values dangerous for the power elements of the boost in the case of operation disturbances. Hence, the addition of this element is not an additional cost for the control device 100.

Figure 4:
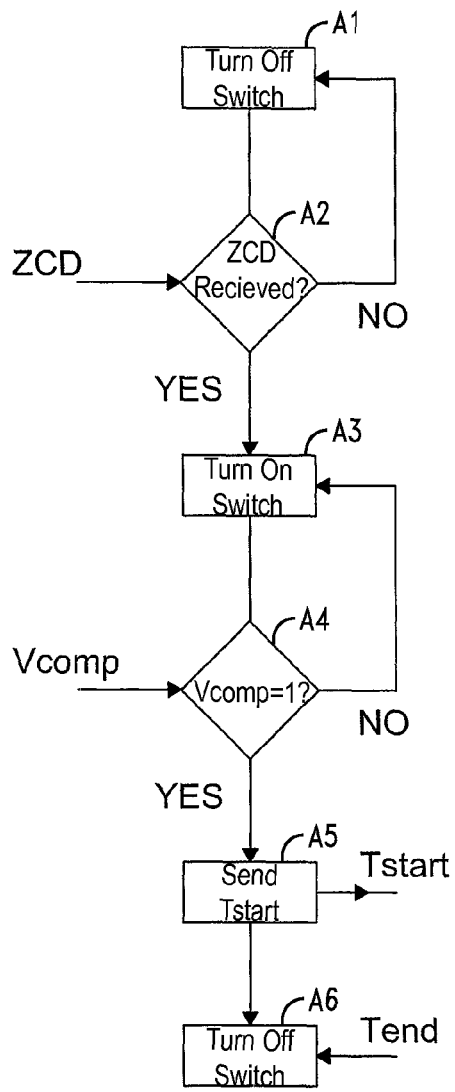
FIG. 4 is a block diagram of the operation carried out by the digital control block in FIG. 3.

FIG. 4 shows the operation method of the firmware belonging to the digital control block 102.

In the initial step A1 the digital control block 102 puts the switch M in an off state by the signal GD. In the successive step A2 if the signal ZCD arrives (indicated by YES) the switch M is put in on state with the successive step A3 else (indicated by NO) the switch M remains in OFF state.

In the successive step A4 the digital control block 102 estimates the signal Vcomp; if the signal Vcomp rises from the logic level 0 to the logic level 1 or vice versa (indicated by YES) it has the passage to the successive step A5 wherein the signal Tstart is sent to the counter 103 to start the counting of the time period TON, always with the switch M in on state.

When the signal Tend representative of the end of counting of the counter 103 arrives at the digital control block 103, the last put the switch M in off state in the successive step A6.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A control device for controlling a switching converter that includes a switch coupled to an inductor, said control device comprising:
   a counter configured to count a time period;
   a comparator configured to compare a first signal, representative of a current flowing through an element of the converter, with a second signal; and
   a digital control block configured to control closing and opening of said switch and to activate said counter to start counting said time period when said first signal crosses said second signal with said switch being closed, said digital control block being configured to open the switch when the counter finishes counting said time period.

2. A control device according to claim 1, comprising:
   a digital device configured to set a digital reference value, and
   a digital to analog converter configured to convert said digital reference value into said second signal.

3. A control device according to claim 2, wherein the digital to analog converter is configured to convert said digital reference value into said second signal at a value of zero.

4. A control device according to claim 2, wherein the digital to analog converter configured to convert said digital reference value into said second signal at a prefixed value different from zero.

5. A control device according to claim 2, further comprising an analog-to-digital converter to convert to a first digital signal a rectified input voltage, said digital device being configured to set the digital reference value based on the first digital signal.

6. A control device according to claim 2, further comprising:
   a first analog-to-digital converter configured to convert a rectified input voltage to a first digital signal; and
   a second analog-to-digital converter configured to convert a signal representative of an output regulated direct current voltage to a second digital signal, said digital device being configured to set the digital reference value based on the first and second digital signals.

7. A control device according to claim 1, wherein the digital control block includes an input terminal configured to receive a third signal representative of a demagnetization of a core of a transformer that includes the inductor, said digital control block being configured to control the closing of said switch in response to a zero crossing of said third signal.

8. A control device according to claim 1, comprising:
   an analog-to-digital converter configured to convert a signal representative of an output regulated direct current voltage to a digital signal; and
   a digital device configured to set the time period based on a difference between said digital signal and a digital reference value.

9. A control device according to claim 1, wherein the control device is integrated in a semiconductor chip.

10. A switching converter, comprising:
    an input terminal configured to receive an alternating supply voltage;
    an output terminal configured to provide a regulated direct current voltage;
    an inductor;
    a switch coupled to the inductor; and a control device configured to control a closing time period and an opening time period of said switch for each of a plurality of cycles, said control device including:
    a counter configured to count the closing time period;
    a comparator configured to compare a first signal, representative of a current flowing through an element of the converter, with a second signal; and
    a digital control block configured to control closing and opening of said switch and to activate said counter to start counting said closing time period when said first signal crosses said second signal with said switch being closed, said digital control block being configured to open the switch when the counter finishes counting said closing time period.

11. A switching converter according to claim 10, wherein the control device includes:
    a digital device configured to set a digital reference value, and
    a digital to analog converter configured to convert said digital reference value into said second signal.

12. A switching converter according to claim 11, wherein the digital to analog converter is configured to convert said digital reference value into said second signal at a value of zero.

13. A switching converter according to claim 11, wherein the digital to analog converter configured to convert said digital reference value into said second signal at a prefixed value different from zero.

14. A switching converter according to claim 11, comprising a rectifier configured to rectify the alternating supply voltage and to output a rectified voltage, wherein the control device includes an analog-to-digital converter to convert the rectified voltage to a first digital signal, and said digital device is configured to set the digital reference value in response to the first digital signal.

15. A switching converter according to claim 10, comprising a rectifier configured to rectify the alternating supply voltage and to output a rectified voltage, wherein the control device includes:
    a first analog-to-digital converter configured to convert the rectified voltage to a first digital signal; and
    a second analog-to-digital converter configured to convert a signal representative of the regulated direct current voltage to a second digital signal, said digital device being configured to set the digital reference value based on the first and second digital signals.

16. A switching converter according to claim 10, wherein the digital control block includes an input terminal configured to receive a third signal representative of a demagnetization of a core of a transformer that includes the inductor, said digital control block being configured to control the closing of said switch in response to a zero crossing of said third signal.

17. A switching converter according to claim 10, wherein the control device includes:
    an analog-to-digital converter configured to convert a signal representative of the regulated direct current voltage to a digital signal; and
    a digital device configured to set the time period based on a difference between said digital signal and a digital reference value.

18. A method of controlling a switching converter that includes an input terminal configured to receive an alternating supply voltage, an output terminal configured to provide a regulated direct current voltage, an inductor, and a switch coupled to the inductor, the method comprising:
    controlling a closing time period and an opening time period of said switch for each of a plurality of cycles, said controlling including:
        counting the closing time period with a counter;
        comparing a first signal, representative of a current flowing through an element of the converter, with a second signal;
        activating said counter to start counting said closing time period when said first signal crosses said second signal with said switch being closed; and
        opening the switch when the counter finishes counting said closing time period.

19. A method according to claim 18, wherein the controlling includes:
    setting a digital reference value, and
    converting said digital reference value into said second signal.

20. A method according to claim 19, wherein:
the converter includes a rectifier configured to rectify the alternating supply voltage and to output a rectified voltage;
the controlling includes converting the rectified voltage to a first digital signal, and
setting the digital reference value includes setting the digital reference value in response to the first digital signal.

21. A method according to claim 18, wherein:
the converter includes a rectifier configured to rectify the alternating supply voltage and to output a rectified voltage;
the controlling includes converting the rectified voltage to a first digital signal and converting a signal representative of the regulated direct current voltage to a second digital signal; and
setting the digital reference value includes setting the digital reference value based on the first and second digital signals.

22. A method according to claim 18, wherein the controlling includes:
    receiving a third signal representative of a demagnetization of a core of a transformer that includes the inductor; and
    closing said switch in response to a zero crossing of said third signal.

23. A method according to claim 18, wherein the controlling includes:
    converting a signal representative of the regulated direct current voltage to a digital signal; and
    setting the time period based on a difference between said digital signal and a digital reference value.

* * * * *